United States Patent [19]
Micke et al.

[11] Patent Number: 6,026,109
[45] Date of Patent: Feb. 15, 2000

[54] HIGH-POWER, SOLID-STATE LASER IN A CYLINDRICAL PACKAGE

[75] Inventors: Dean W. Micke, Marthasville; Dana A. Marshall, Frontenac; James T. Tracey, St. Peters, all of Mo.

[73] Assignee: Cutting Edge Optronics, Inc., St. Charles, Mo.

[21] Appl. No.: 09/012,123

[22] Filed: Jan. 22, 1998

[51] Int. Cl.$^7$ ................................................ H01S 3/08
[52] U.S. Cl. .............................. 372/92; 372/34; 372/10; 372/98
[58] Field of Search ................................. 372/92, 34, 10, 372/98, 99

[56] References Cited

U.S. PATENT DOCUMENTS

| | | | |
|---|---|---|---|
| 3,633,126 | 1/1972 | Martin et al. | 331/94.5 |
| 3,771,031 | 11/1973 | Kay | 317/235 R |
| 3,810,041 | 5/1974 | Martin | 331/94.5 |
| 4,228,406 | 10/1980 | Lewis et al. | 331/94.5 D |
| 4,233,567 | 11/1980 | Chernoch | 331/94.5 P |
| 4,468,774 | 8/1984 | Robbins | 372/34 |
| 4,575,854 | 3/1986 | Martin | 372/75 |
| 4,710,940 | 12/1987 | Sipes, Jr. | 372/75 |
| 4,730,324 | 3/1988 | Azad | 372/33 |
| 4,731,795 | 3/1988 | Clark et al. | 372/107 |
| 4,741,354 | 5/1988 | DeMild, Jr. | 137/240 |
| 4,972,426 | 11/1990 | Steffen | 372/35 |
| 5,150,371 | 9/1992 | Abramov et al. | 372/34 |
| 5,156,999 | 10/1992 | Lee | 437/215 |
| 5,253,260 | 10/1993 | Palombo | 372/34 |
| 5,291,504 | 3/1994 | Bournes | 372/92 |
| 5,521,936 | 5/1996 | Irwin | 372/75 |
| 5,550,853 | 8/1996 | Ostler | 372/92 |
| 5,663,979 | 9/1997 | Marshall | 372/103 |
| 5,663,980 | 9/1997 | Adachi | 372/34 |

FOREIGN PATENT DOCUMENTS

| | | | |
|---|---|---|---|
| 2215906 | 9/1989 | United Kingdom | H01S 3/09 |
| 2241109 | 8/1991 | United Kingdom | H01S 3/00 |
| WO 90/13158 | 11/1990 | WIPO | H01S 3/07 |

OTHER PUBLICATIONS

Newport Opto–Mechanical Components 1997/98 Catalog, ULM Series, Laser Mounts, Copyright 1997, p. 2–20.
Oriel Precision Products Catalog, vol. 1, Precision Gimbal Mounts, Copyright 1992, pp. 3–38 and 3–39.
Creative Stars Product Catalog, 1997/98, Laser Mounts, Precision Mounts, Four–Axis Adjustable Laser Mount, and Vertical Laser Mounts, Copyright 1997, pp. 48–49.
SDL, Inc., SDL–FL10 Enclosure Specifications, 1993, 2 pp.
Melles Griot, Collimated Diode Laser Assemblies, 1995/96, Copyright 1995, p. 49–7.
Amoco Laser Company, ALC 1064–50P User's Manual, date prior to filing date.

*Primary Examiner*—Leon Scott, Jr.
*Attorney, Agent, or Firm*—Arnold White & Durkee

[57] ABSTRACT

A solid-state laser system for producing high output power and which is packaged in a small, cylindrical housing is set forth. The system includes a plurality of optical energy sources which emit energy that is absorbed by a solid-state laser medium that is configured as a rod. The solid-state laser medium has a central axis, first and second end surfaces, and outer surface between the end surfaces upon which the energy emitted from the optical energy sources is incident. The energy power sources are typically semiconductor laser diode arrays. The laser diode arrays are positioned adjacent to the cylindrical outer surface of the laser medium and usually extend along a substantial portion of the entire length of the outer surface. The system also includes first and second mirrors which are substantially aligned with the central axis of the laser medium for producing laser resonation through the first and second end surfaces of the laser medium. Because of the waste heat produced by the laser medium and the laser diode arrays, the laser system contains a manifold system for circulating a fluid past these components. The cylindrical housing has a diameter that is preferably less than about 2.0 inches and is mechanically coupled to the optics bench. The cylindrical housing is the same size as the housings used in other low-power laser systems so that the same mounting structures which are commonly used to support these other common lasers can be used to support this high-power, solid-state laser system.

49 Claims, 10 Drawing Sheets

HIGH-POWER, SOLID-STATE LASER IN A CYLINDRICAL PACKAGE

FIELD OF THE INVENTION

The present invention relates generally to a solid-state laser system and, in particular, to a solid-state laser that is packaged within a small cylindrical housing and produces high output power for industrial, medical and scientific use.

BACKGROUND OF THE INVENTION

Solid-state laser systems are characterized in that they have a solid-state laser gain medium which converts energy from an optical pump source to a coherent output laser beam. The pump source can be one of many available energy-producing systems such as flash lamps or semiconductor laser diodes. The energy produced by the pump source is incident upon the laser medium and absorbed by the laser medium.

The absorbed energy in the laser medium causes the atoms in the laser medium to be excited and placed in a higher energy state. Once at this higher state, the laser medium releases its own energy which is placed into an oscillating state by the use of a laser resonator. The laser resonator includes at least two reflective surfaces located on either side of the laser medium. The laser resonator may be designed to continuously release a laser beam from the system. Alternatively, the resonator can be designed such that when the energy oscillating through the laser medium reaches a predetermined level, it is released from the system as a high-power, short-duration laser beam.

In many systems, the laser medium is Neodymium-doped, Yttrium-Aluminum Garnet (Nd:YAG). A laser medium made from Nd:YAG absorbs optical energy most readily when the energy is at a wavelength of approximately 808 nanometers (nm). Thus, the source to pump the Nd:YAG laser medium should be emitting light energy at approximately 808 nm. Gallium arsenide semiconductor laser diodes can be manufactured with dopants (e.g. aluminum) that will cause the emitted light to be in a variety of wavelengths, including 808 nm. Thus, the semiconductor laser diodes, which are lasers by themselves, act as the pump source for the laser medium.

The emitted light produced from the solid-state laser system is generally coherent and exits the system in a predefined area. Thus, the optical power produced can be readily focused by the use of other optical components such as lenses. The resultant emitted energy can be used for a variety of industrial, medical, and scientific purposes such as cutting material, melting materials, ablating materials or vaporizing materials.

It has been an objective for laser manufacturers to develop high-power, solid-state systems that can be packaged in small housings. However, this objective is difficult to meet due to the large amount of waste heat produced by these systems and the necessity for large areas in which to provide adequate cooling. As the output power in these systems increases, the waste heat increases which puts more demands on these cooling systems.

Furthermore, these laser systems are often used in settings, such as laboratories, which are equipped with devices for mounting other types of laser systems, such as gas lasers. A basic type of gas laser is a Helium-Neon ("He—Ne") laser which has a relatively low output power, usually less than 0.1 Watt. Because the waste heat produced by a He—Ne laser is small, the system can be air-cooled and can be efficiently packaged in a simple cylindrical housing. These cylindrically-packaged He—Ne lasers are mounted in several styles of laser mount structures which provide for easy adjustment of the output beams.

Another type of laser that is mounted in a small cylinder is a single-emitter, semiconductor laser diode. However, the output powers on these devices are usually less than about 0.5 Watt. Like the gas laser, this system relies on air cooling

SUMMARY OF THE INVENTION

The present invention is a solid-state laser system for producing high output power and which is packaged in a small, cylindrical housing. The system includes a plurality of optical energy sources which emit energy that is absorbed by a solid-state laser medium that is configured as a rod. The solid-state laser medium has a central axis, first and second end surfaces, and an outer surface between the end surfaces upon which the energy emitted from the optical energy sources is incident.

The optical energy sources are typically semiconductor laser diode arrays. The laser diode arrays are positioned adjacent to the cylindrical outer surface of the laser medium and usually extend along a substantial portion of the length of the outer surface. Each of the laser diode arrays is circumferentially spaced at an angle relative to the central axis from an adjacent one of the laser diode arrays. In one preferred embodiment, there are three laser diode arrays that are at 120° from each other.

The system also includes first and second mirrors which are substantially aligned with the central axis of the laser medium for producing laser resonation through the first and second end surfaces of the laser medium. The first mirror has a high reflectivity and is positioned on one side of the laser medium. The second mirror is an output coupling mirror with a lower reflectivity than the first mirror and is positioned on the opposite side of the laser medium. The laser beam is transmitted through the second mirror.

The laser medium and the plurality of laser diodes are mounted on a common structure, an optics bench. Additionally, at least one of the mirrors is typically mounted on the optics bench. A device for producing a pulsed output mode in the laser beam, such as a Q-switch, can also be mounted in this structure. Accordingly, the optical components on this one structure can be optically aligned before being inserted into the cylindrical housing.

The cylindrical housing has a diameter that is less about 3.0 inches, and preferably less than about 2.0 inches. The cylindrical housing is mechanically coupled to the optics bench. In the preferred embodiment, the optics bench has external threads which mate with internal threads at the end of the cylindrical housing. The optics bench may also have an O-ring on a cylindrical portion that is spaced from the externally threaded portion that engages the internal cylindrical wall of the housing. This O-ring supports the other end of the optics bench within the housing.

The cylindrical housing also serves an optical function in that it includes the second mirror of the laser resonator (i.e. the output coupling mirror) from which the laser beam is emitted. Preferably, this second mirror is detachably connected to the end of the cylindrical housing that opposes the end into the optics bench is threaded.

Because of the waste heat produced by the laser medium and the laser diode arrays, the laser system contains a manifold system for circulating a fluid past these components. In a preferred embodiment, the threaded end of the optics bench which mates with the housing includes an inlet port and an exit port. The inlet port delivers fluid to a manifold within the optics bench and is distributed in a parallel fluid path past each of the laser diode arrays and the laser medium. The fluid is then returned to the manifold within the optics bench and is returned to the exit port.

The solid-state laser system may include a gear assembly with at least two gears. A first gear drives a second gear, which includes a plurality of apertures, to move one of the plurality of apertures into alignment with the central axis of the laser medium. In a preferred embodiment, the first gear includes an elongated shaft which terminates in a screw head on the exterior of the housing. By rotating the screw head, the first gear moves the second gear which results in the desired aperture being aligned with the central axis of the laser medium. A set of detents for releasably locking the second gear in a plurality of positions may also be used to ensure the corresponding one of the plurality of apertures is accurately aligned with the central axis.

Because the cylindrical housing is the same size as the housing used in most He—Ne lasers and some single emitter laser diode systems, the same mounting structures which are commonly used in the laser industry to mount the He—Ne and single-emitter diode lasers can be used to support a high-power, solid-state laser which operates in continuous-wave (CW) or pulsed mode.

The above summary of the present invention is not intended to represent each embodiment, or every aspect, of the present invention. This is the purpose of the figures and the detailed description which follow.

BRIEF DESCRIPTION OF THE DRAWINGS

Other objects and advantages of the invention will become apparent upon reading the following detailed description and upon reference to the drawings in which.

Figure 1:
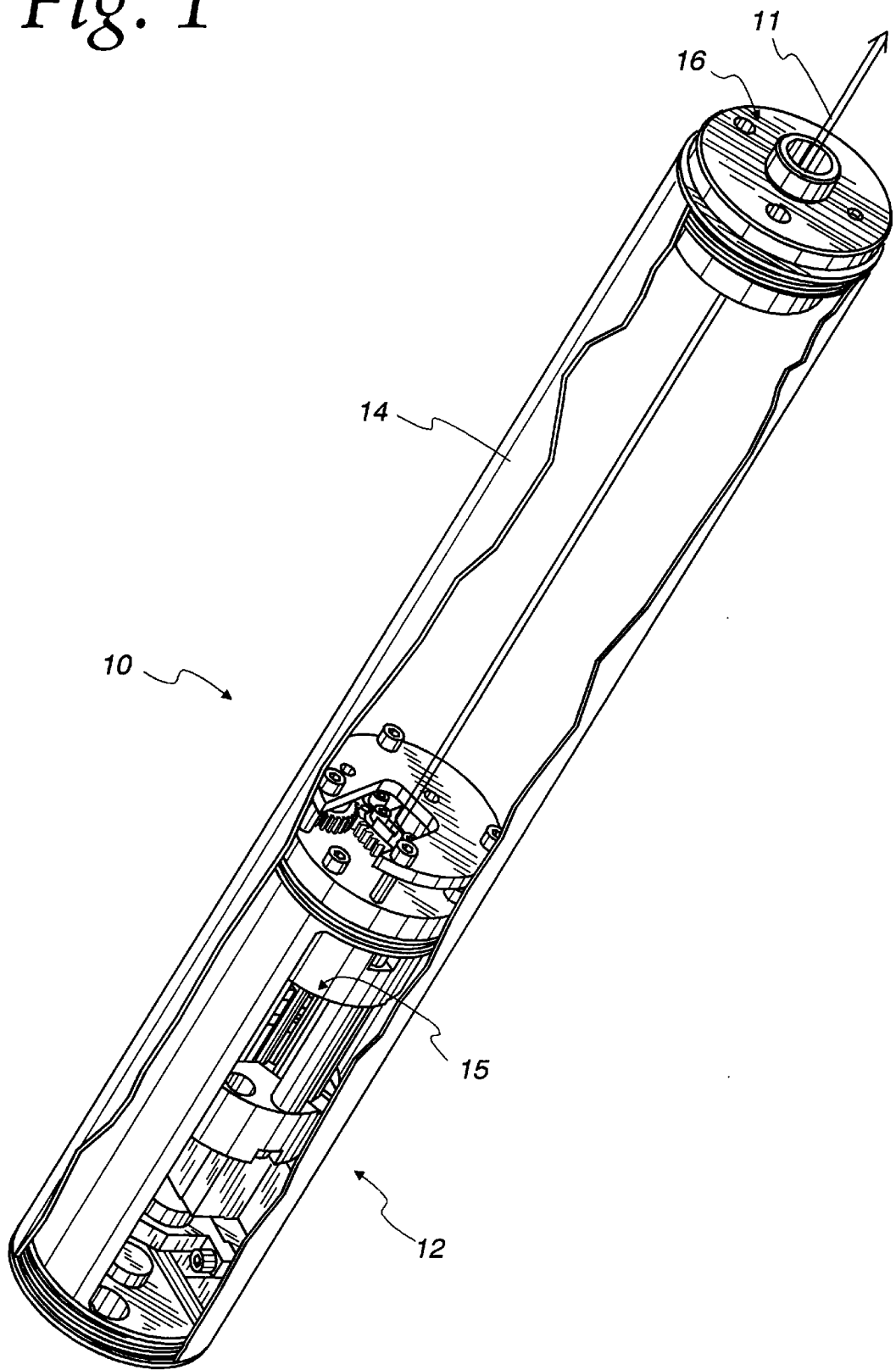
FIG. 1 is an isometric view of the solid-state laser system of the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed. Quite to the contrary, the intention is to cover all modifications, equivalents, and alternatives falling within the spirit and scope of the invention as defined by the appended claims.

DETAILED DESCRIPTION OF THE INVENTION

Referring now to FIG. 1, a solid-state laser system 10 for producing a high-power laser beam 11 is illustrated. The laser system 10 includes an optics bench assembly 12 that contains the majority of the optical components. The optics bench assembly 12 is packaged within a cylindrical housing 14. A laser head assembly 15, which generates the high-power laser beam 11, is mounted on the optics bench assembly 12. An output coupling mirror assembly 16 through which the laser beam 11 is transmitted is attached to and seals an end of the cylindrical housing 14.

Figure 2:
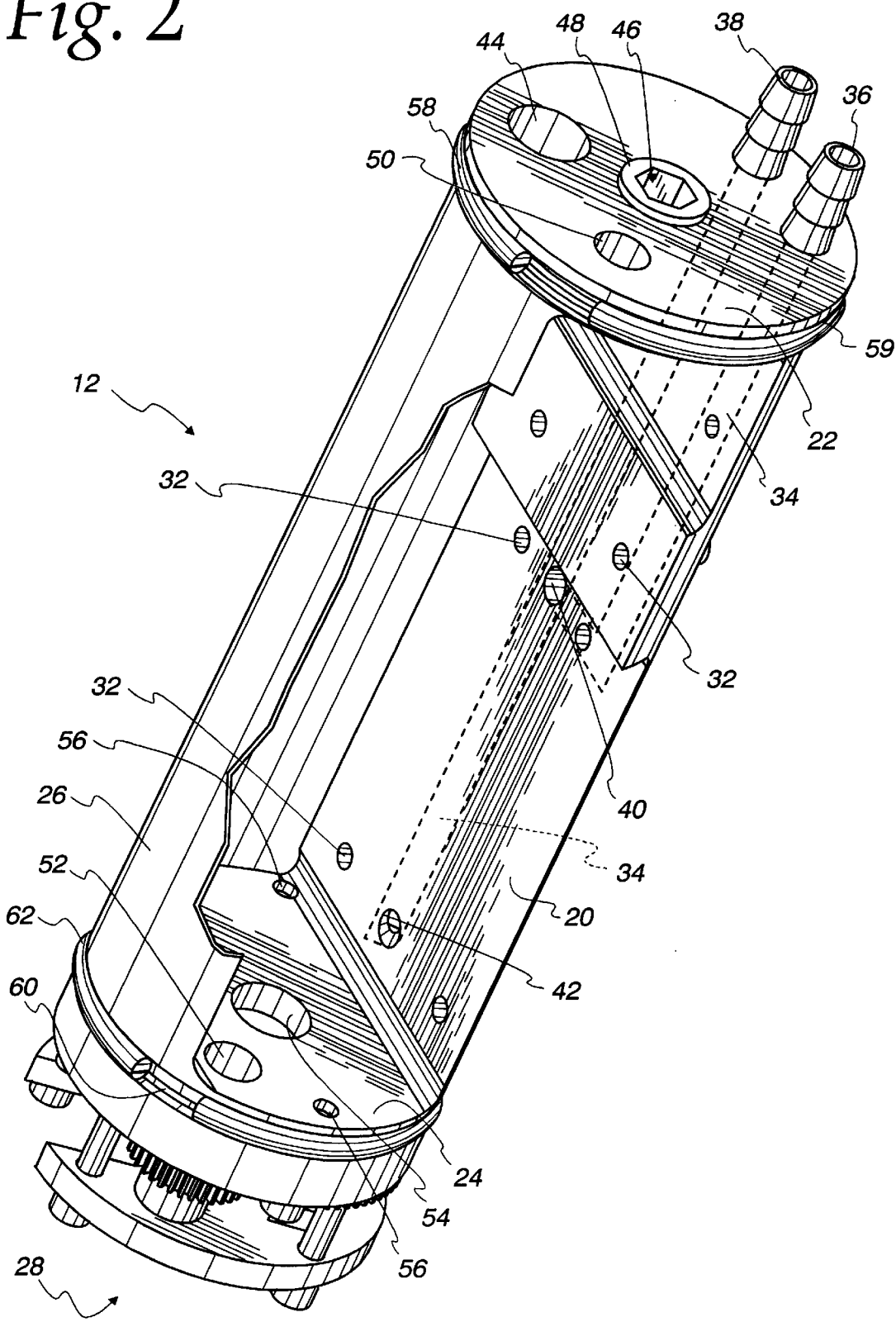
FIG. 2 is an isometric view of an optics bench of the present invention on which a majority of the optical components are mounted.

As seen best in FIG. 2, the optics bench assembly 12 is a cylindrical block of material (e.g. brass) with its center removed to produce a floor 20, a first circular end piece 22, a second circular end piece 24, and a top segment 26. To provide for a variety of apertures in the laser system 10, an aperture assembly 28 is attached to the second end piece 24. The aperture assembly 28 will be described in detail later, especially with reference to FIGS. 6–7.

The floor 20 may include several levels, such as raised section 30, to mount various optical components. The raised section 30 and the main floor 20 have several bores 32 for mounting these components. Some of these bores 32 may be threaded while some may simply act as through-bores for receiving a fastener from the underside of the optics bench assembly 12.

Positioned below the floor 20 is a primary manifold system 34 (shown in detail in FIG. 10) which provides cooling for the optical components, especially the laser head assembly 15. The primary manifold system 34 includes an inlet port 36 and an exit port 38 which are mounted on the first end piece 22. The cooling fluid enters the primary manifold system 34 via the inlet port 36 and is transported to an opening 40 which is coupled to the laser head assembly 15 (see FIGS. 3 and 4) that includes its own internal manifold system which is shown in detail in FIG. 4. After being distributed through the laser head assembly 15, the fluid returns to the primary manifold 34 through opening 42 and exits the system via exit port 38.

To provide electrical connection, the first end piece 22 includes an electrical port 44 which provides access for the wires conducting the electrical energy to the laser head assembly 15. Wires may simply pass from the internal components within the housing 14, through the electrical port 44, and to a connector assembly on the end of the wires. A control system would then be coupled to the connector assembly. This results in what is commonly called a "pig-tail" connector assembly. Alternatively, the electrical port 44 may include a high-current electrical connector to which an external control system is electrically coupled. In either case, it is desirable for the electrical port 44 to be sealed to maintain an appropriate environment within the housing 14. If the wires simply pass through the electrical port 44, then it may be necessary to provide potting material to seal the port 44.

The first end piece 22 also includes an alignment window 46 which is centered on the axis of the laser beam 11. The alignment window 46 is covered by an opaque plug 48 which can be removed. When the plug 48 is removed, a low-power, eye-safe laser beam (e.g. a He—Ne laser) from an external source can be sent through this window 46 to determine where the exact location of the laser beam 11 exiting from the output coupling aperture 16 will be when the high-power laser beam 11 is actuated. Thus, the operator of the laser system 10 is not required to provide power to the laser system 10 to locate the beam at its desired target.

The first end piece 22 further includes an opening 50 into which a manual aperture actuation device, such as a screw head, can be placed to actuate the aperture system 28. A similar opening 52 is provided on the second end piece 24 allowing access to the aperture system 28. Like the electrical port 44, the opening 50 must be sealed as well.

The second end piece 24 includes a beam output hole 54 to provide for the exiting of the laser beam 11. The second end piece 24 also includes several holes 56 to provide for the attachment of the aperture assembly 52.

To secure the fully populated optics bench assembly 12 in the cylindrical housing 14, the first end piece 22 includes an externally threaded region 58 around its circumference. This externally threaded region 58 mates with internal threads along the interior wall at the end of the housing 14. A seal device, such as O-ring 59 (more readily seen in FIG. 6), is placed adjacent to the externally threaded region 58 to seal the joint between the housing 14 and the first end piece 22 of the optics bench assembly 12.

The second end piece 24 includes a groove 60 into which an O-ring 62 is placed. The O-ring 62 has a diameter that is slightly larger than the internal diameter of the housing 14. The O-ring 62 does not serve a sealing purpose but instead serves the function of supporting that end of the optics bench assembly 12 in the housing 14. Also, because of its resiliency, the O-ring 62 absorbs some of the mechanical shock from the exterior of the housing 14.

Figures 3, 3A:
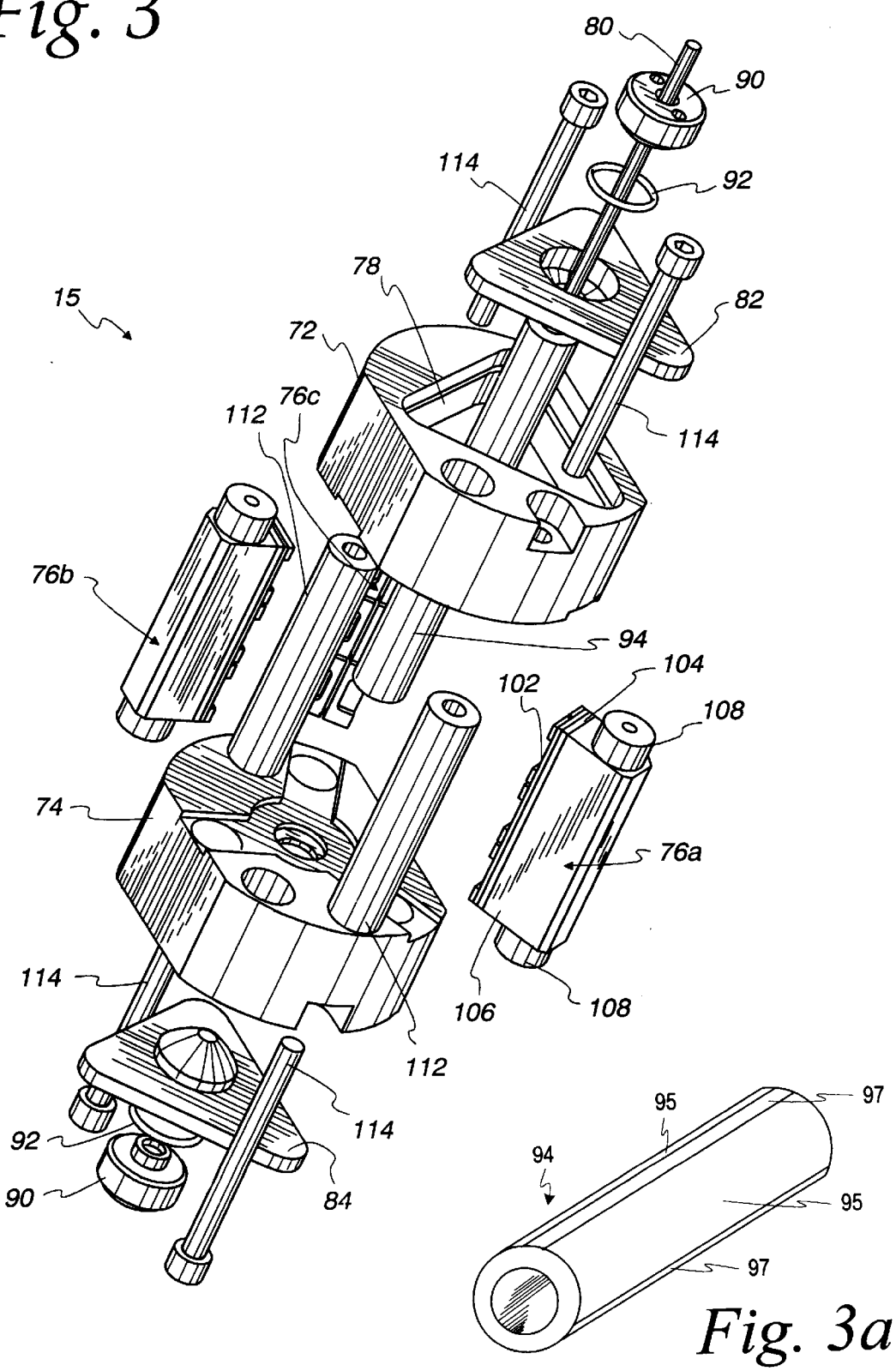
FIG. 3 is an exploded isometric view of the laser head assembly that is mounted on the optics bench.
FIG. 3A is an isometric view of the fluid flow tube which surrounds the laser medium.
Figure 4:
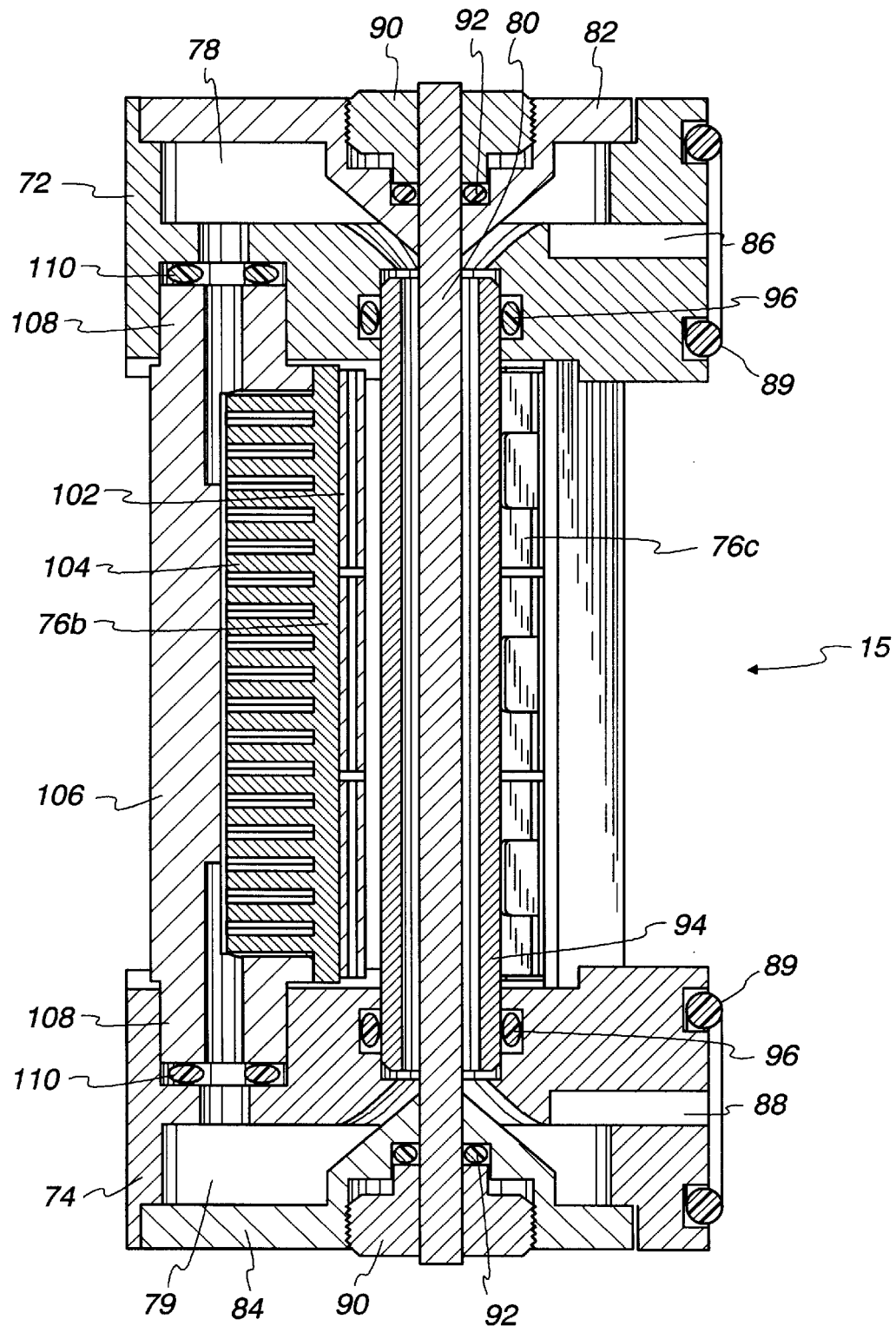
FIG. 4 illustrates in cross-section the laser head assembly including the secondary manifold system which distributes cooling fluid to the semi-conductor laser diode arrays and the laser medium.

Referring now to FIGS. 3 and 4, the laser head 15 has a first end cap 72 and a second end cap 74 between which are positioned three laser diode array assemblies 76a, 76b, and 76c positioned at 120° from each other. Each laser diode array assembly 76 has several semiconductor laser diode arrays positioned along its length for pumping a solid state laser medium 80. The cross-section of FIG. 4 is taken through the center line of laser diode array assembly 76a such that laser diode array assembly 76a is seen in cross-section and laser diode array assembly 76c is seen in the background.

The first end cap 72 and the second end cap 74 include manifolds 78 and 79, respectively, which are machined out of the end caps. After this machining process, end cap covers 82 and 84, respectively, are soldered or welded to respective end caps 72 and 74. Each manifold 78 and 79 includes an opening 86 and 88 which provide access for the fluid to enter the respective manifold 78 and 79. It is these openings 86 and 88 which communicate with openings 40 and 42 on the floor 20 of the optics bench assembly 12 shown in FIG. 2. To ensure against leaks at the interface between the optics bench and the end caps 72 and 74, a seal such as O-ring 89 is placed in the grooves around the openings 86 and 88 in the laser head assembly 15. For the purposes of clarity, the manifold system of the laser head assembly 15 will be generically referred to as the secondary manifold to distinguish it from the primary manifold 34 of the optics bench assembly 12.

To mount and seal the laser medium 80 in the laser head assembly 15, a threaded retainer nut 90 is threaded into each of the end cap covers 82 and 84 which compresses an O-ring 92 onto the outer surface of the laser medium 80. Accordingly, no fluid can flow out the end of the end cap covers 82 and 84. Also as can be seen in FIG. 4, the ends of the laser medium 80 extends slightly past the ends of the first and second end pieces 72 and 74.

To ensure that the fluid flows past the laser medium 80 especially in the regions where it is receiving energy from the laser diode array assemblies 76, a flow tube 94 is sandwiched between the end caps 72 and 74. The flow tube 94 is sealed at each of its ends by an O-ring 96. Thus, the outer surface of the laser medium 80 and the inner wall of the flow tube 94 define a fluid flow region that has an annular cross-section. The fluid is chosen so as to transmit the optical energy from the laser diode arrays.

With regard the laser diode array assemblies 76, each assembly includes multiple laser diode arrays 102 containing a plurality of laser diodes which convert electrical energy into optical energy that is absorbed in the laser medium 80. Each laser diode array 102 is soldered to a pin-fin heat exchanger 104. The cooling fins of the pin-fin heat exchanger 104 are placed in a heat exchanger housing 106 and the outer flange of the heat exchanger 104 is soldered or welded to the heat exchanger housing 106. Each heat exchanger housing 106 also includes two circular fluid ports 108 which are inserted into two recesses, one on each of the end caps 72 and 74. To protect against leaks, a seal, such as O-ring 110, is compressed between each fluid port 108 and the interior wall defining the recess in each end cap 72 and 74.

The laser diode arrays 102 are electronically connected in series within each laser diode array assembly 76. Furthermore, the laser diode array assemblies 76 are connected in series. Consequently, there is one electrical input wire and one electrical output wire for all of the laser diode array assemblies 76.

To hold the entire laser head assembly 15 together, a pair of tube-shaped stand-offs 112 (FIG. 3 only) are positioned between the first end cap 72 and second end cap 74. Each stand-off 112 has internal threads for receiving two fasteners 114, one from the first end cap 72 and one from the second end cap 74.

As mentioned above, the optical energy from the laser diode array assemblies 76 is absorbed by the laser medium 80. To ensure absorption, the outer surface of the flow tube 94 is coated with a reflective coating 95 except for non-coated regions 97, shown in FIG. 3A, where the energy from the laser diode arrays assemblies 76 enters the surface of the flow tube 94. Because the optical energy from the laser diode array assemblies 76 is usually centered along a line, the non-coated regions 97 will extend along the length of the flow tube 94 and have a narrow rectangular shape. Thus, any optical energy that is not absorbed in the laser medium 80 after entering the laser medium 80 travels through the coolant and the flow tube 94 where it is reflected off the coating 95 on the opposing outer surface of the flow tube 94 and is transmitted back through the laser medium 80 to increase the likelihood of absorption.

In a preferred embodiment where the laser medium 80 has a diameter of 3 mm and is pumped by three laser diode array assemblies 76, the flow tube 94 has an outer diameter of about 5 mm and an inner diameter of about 4 mm. The laser diode arrays 102 are nearly touching the outer surface of the flow tube 94 at the non-coated regions 97. To allow the energy to enter the flow tube 94, each of the three non-coated regions 97 on the outer surface of the flow tube 94 is about 1 mm wide. The coating 95 is 2000 Angstroms of silver which is deposited on the flow tube 94 with a vacuum-evaporation process.

The amount of absorption of energy by the laser medium 80 at a given wavelength depends on various factors such as the type of dopants provided in the laser medium 80, the concentration of dopants, and the temperature at which the laser medium 80 is operated. By way of example, if the laser medium 80 is made from Neodymium (3+) doped, Yttrium-Aluminum Garnet (Nd:YAG), the peak absorption occurs at about 808 nm when the temperature of the material is about 30° C. When the laser diodes from the laser diode arrays 102 are made of gallium arsenide with aluminum doping (AlGaAs), they emit radiation at approximately 808 nm which matches the maximum absorption spectrum for the Nd:YAG material. When an Nd:YAG laser medium absorbs energy at 808 nm, it then releases energy at a wavelength of about 1064 nm. These materials are used in a preferred embodiment of the solid state laser system 10.

Figure 5:
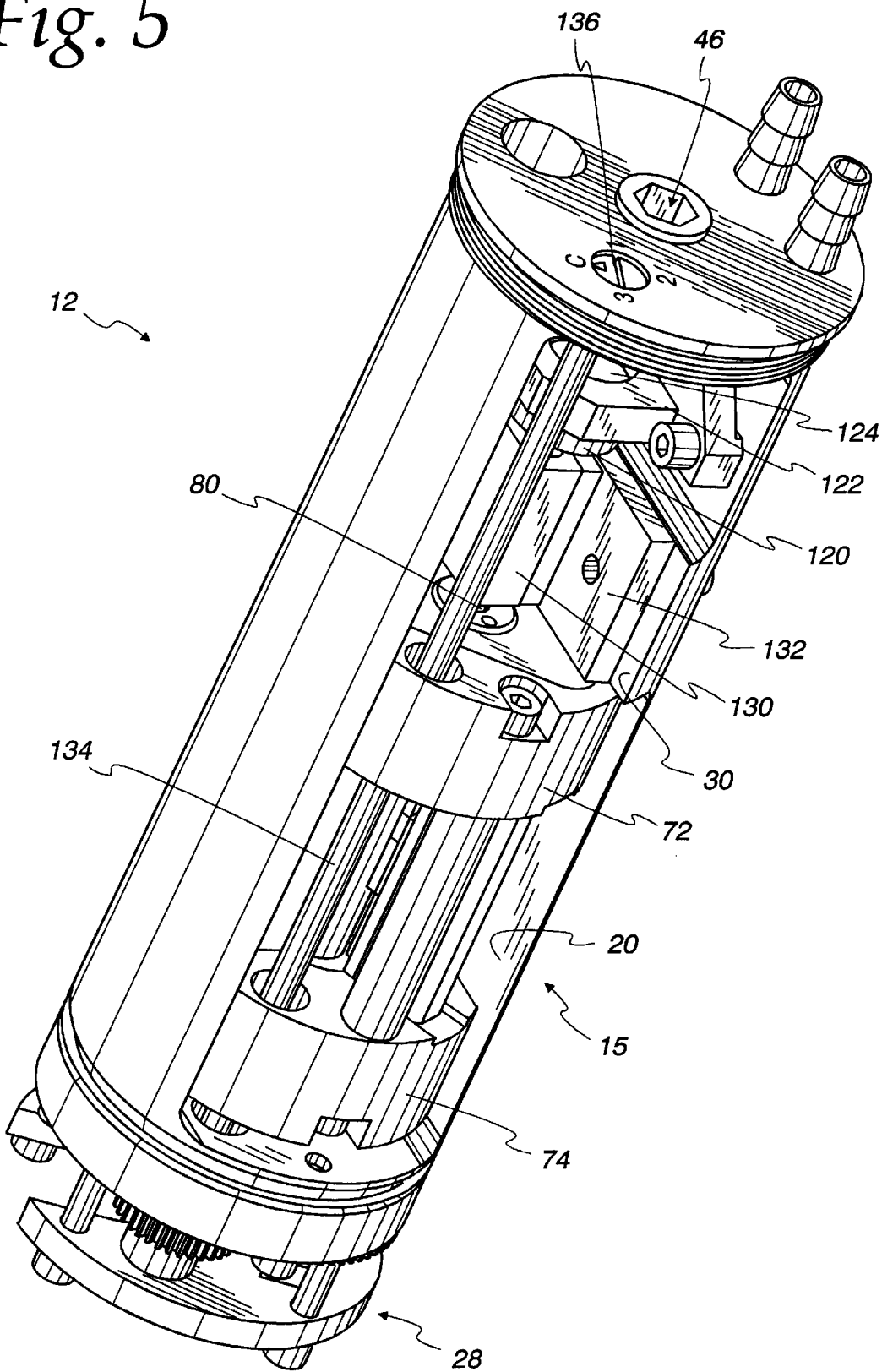
FIG. 5 is an isometric view of the optics bench of FIG. 2 after it is fully populated with components.

FIG. 5 illustrates the laser head assembly 15 mounted on the optics bench assembly 12. The first and second end caps 72 and 74 are mounted on the main floor 20 of the optics bench assembly 12 by fasteners which are inserted from the bottom of the optics bench assembly 12 into threaded bores in the first and second end caps 72 and 74. To produce laser resonation, a reflective surface must be positioned outside of each end of the laser medium 80 to cause energy to be continuously sent through the laser medium 80. A high-reflective (HR) mirror 120 is connected to a structure 122 which is mounted on the optics bench assembly 12. The structure 122 has a hole 124 on the side which opposes the HR mirror 120 that is aligned with the alignment window 46. The front surface of the HR mirror 120 typically has a reflectivity value of at least about 99% when the wavelength is 1064 nm. However, the HR mirror 120 transmits energy at other wavelengths such that an alignment beam that is sent through the alignment window 46 is transmitted through the HR mirror 120 and into the laser medium 80. For example, the HR mirror 120 would transmit energy at about 630 nm which is typical of He—Ne lasers. The other reflective surface is located on the output coupling assembly 16 which is shown in FIG. 1, and will described in more detail in FIG. 8. In an alternative embodiment, the end of the laser medium 80 can have an HR coating so that an additional component, the HR mirror 120, can be removed from the laser system 10.

If the laser system 10 is to provide a pulsed output, a Q-switch 130 is connected to a Q-switch mount structure 132 that is attached to the raised section 30, the Q-switch 130 is aligned with the end surface of the laser medium 80. When the Q-switch 130 "opens" to allow for optical transmission, energy can resonate between the two reflective surfaces such that a high-energy, short-duration pulse exits from the system 10. In a preferred embodiment, the Q-switch 130 is an acoustic-optic device which is switched between an opened and closed state by inducing acoustic waves from a radio-frequency transducer affixed to a surface of the device.

FIG. 5 also illustrates an elongated shaft 134 that is used to drive the aperture assembly 28. The elongated shaft 134 has a head 136 at its terminal end which can be manipulated by a common screw driver. The head 136 may have a pointing device to indicate which of the plurality of apertures is in use. Since one of the apertures may prohibit the energy from leaving the laser system, one of the markings may indicate a closed position ("C").

Since all of the optical components needed to operate the laser system 10 (except the OC assembly 16) are mounted on the optics bench assembly 12, these components can be aligned before being mounted in the housing 14. This is quite advantageous since the only remaining alignment step is simply the adjustment of the OC mirror on the OC assembly 16. The alignment procedure requires the transmission of a low power (e.g. He—Ne laser) through the alignment window 46 so that each component (HR mirror 120, laser medium 80, Q-switch 130, and apertures in the aperture assembly 28) on the optics bench assembly 12 is along a common axis. Additionally, because the laser medium 80 can be optically affected by thermal stress while in operation, the system 10 can be operated at full power outside the housing 14 with a test unit OC mirror positioned at the correct distance from the laser head assembly 15 to provide for precise alignment at high powers as well.

Figure 6:
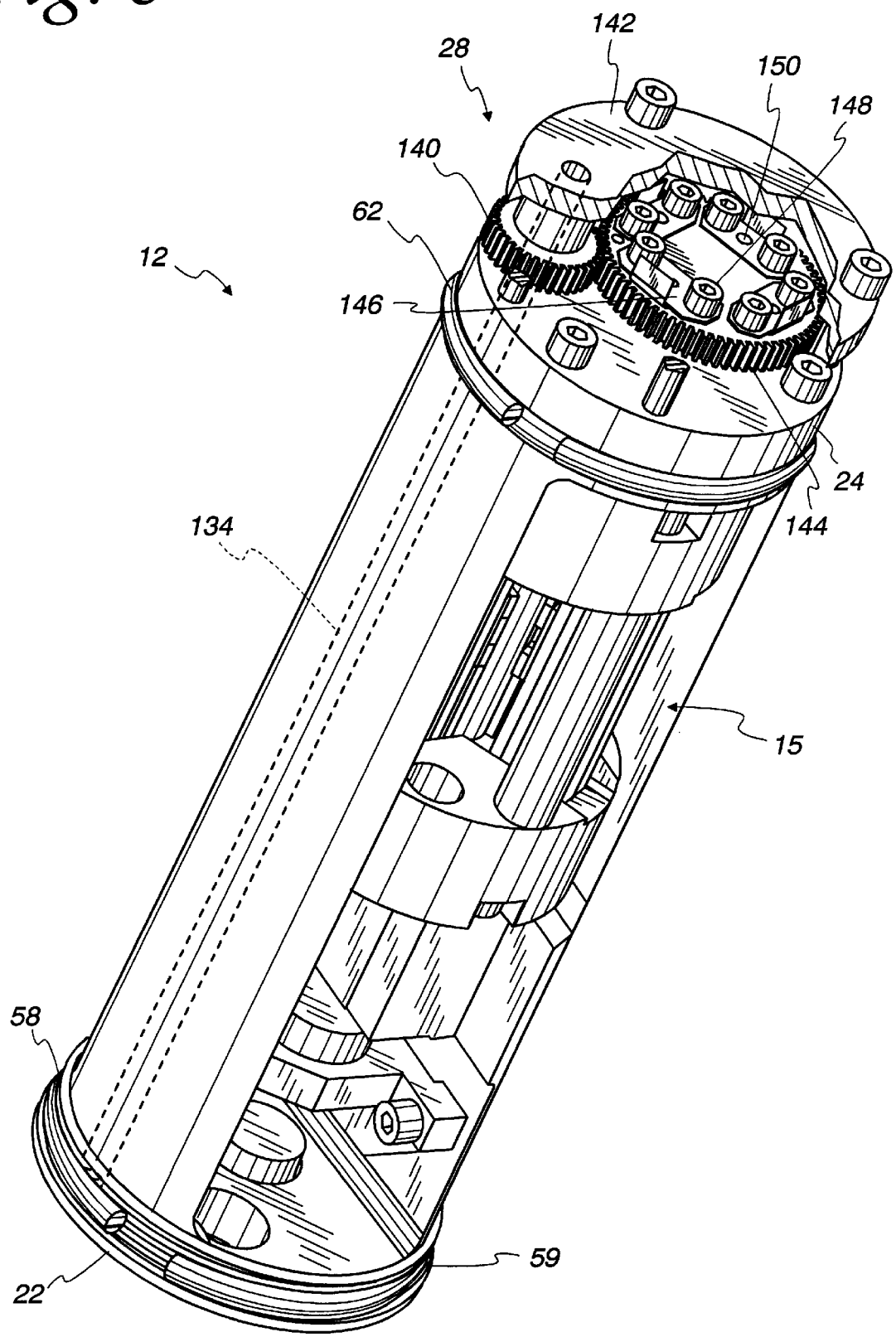
FIG. 6 is an isometric view of the optics bench of FIG. 2 from the view opposing the view of FIG. 5.

FIG. 6 is an isometric drawing of the optics bench assembly 12 which better illustrates the internal side of the first end piece 22. The threaded surface 58 has a slightly smaller diameter than the end surface of the first end piece 22. Thus, the O-ring 59 is compressed between the annular end surface of the housing 14 and the end shoulder of the first end piece 22 when the optics bench assembly 12 is mounted in the housing 14.

Figure 7:
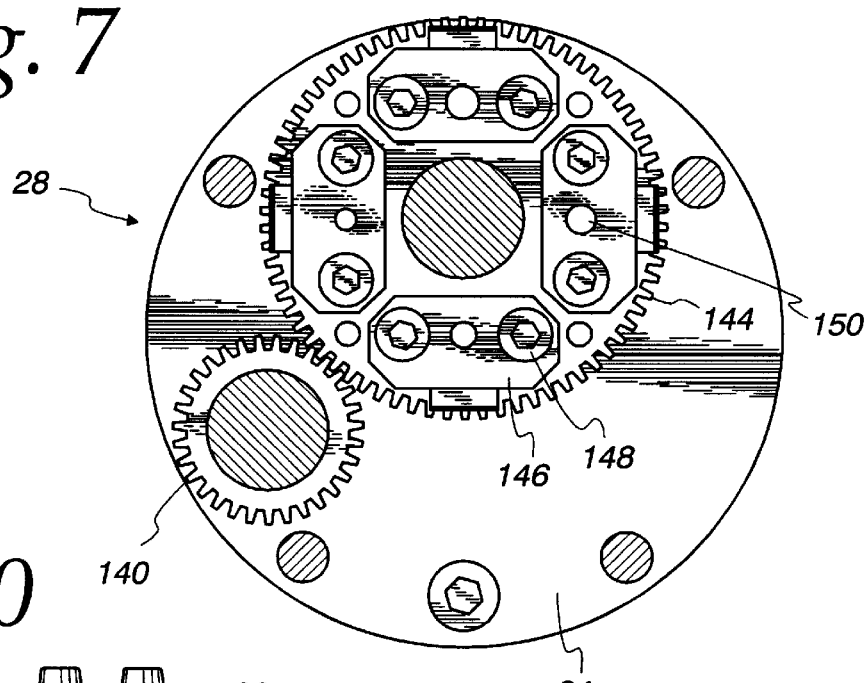
FIG. 7 is an end view of the optics bench assembly which shows the details of the aperture assembly.

FIG. 6, along with FIG. 7, illustrate the aperture assembly 28 mounted to the second end piece 24. The elongated shaft 134 is connected to a first gear 140. To mount the elongated shaft 134 on the back side of the first gear 140, a support plate 142 is provided into which the end of the elongated shaft 134 is inserted. The first gear 140 drives a second gear 144 which is supported between the support plate 142 and the second end piece 24. The support plate 142 has a central cut-out so that it does not block the central axis of the laser medium 80.

The second gear 144 has an axis which is offset from the central axis of the laser medium 80, which is also the central axis of the laser beam 11. However, a portion of the second gear 144 overlaps with this central axis. At the radius of this overlap point, the second gear 144 is provided with a plurality of holes and threaded bores adjacent to each hole. An aperture device 146 is placed over each hole and attached to the second gear 144 by fasteners 148 which mate with the threaded bores in the second gear 144. Each aperture device 146 includes an aperture 150 which can be rotated through the central axis of the laser medium 80. Because the second gear 144 is provided with multiple apertures 150, rotation of the second gear 144 changes the size of the laser beam 11 for the solid-state laser system 10. The operator simply accomplishes this task by rotating the head 136 of the elongated rod 134 which, in turn, rotates the first gear 140. The sizes of the gears can be chosen to provide for unique positions for each of the markings on the first end piece 22 adjacent to the head 136 as discussed with respect to FIG. 5.

Furthermore, because the aperture devices 146 are fastened to the second gear 144, the second gear 144 is used in a variety of systems where the range of sizes for the apertures varies. For example, one laser system may require four apertures between 2 mm and 3 mm. Another second laser system may require four apertures between 2.5 mm and 4 mm. Because the apertures devices are interchangeable on the second gear 144, the second gear 144 can accommodate both systems as long as the underlying hole in the second gear 144 is as large as the aperture that is needed. In one preferred system where the laser medium 80 has a diameter of 3 mm, the apertures 150 have sizes of 3 mm, 2 mm, 1.5 mm, and 1.0 mm.

Additionally, because the aperture device 146 can simply have no aperture 150, the aperture assembly 28 can also act as a shutter which prohibits any laser beam 11 from leaving the solid-state laser system 10.

The aperture assembly 28 can also be provided with a detent to lock the second gear 144 in a specific position. For example, the second end piece 124 and the second gear 144 can be mated with one of a variety of detent mechanisms to ensure that the chosen aperture 150 is accurately aligned with the central axis of the laser medium 80. For example, a spring-loaded, ball-type detent that fits into a corresponding spherical indentation would suffice.

Figure 8:
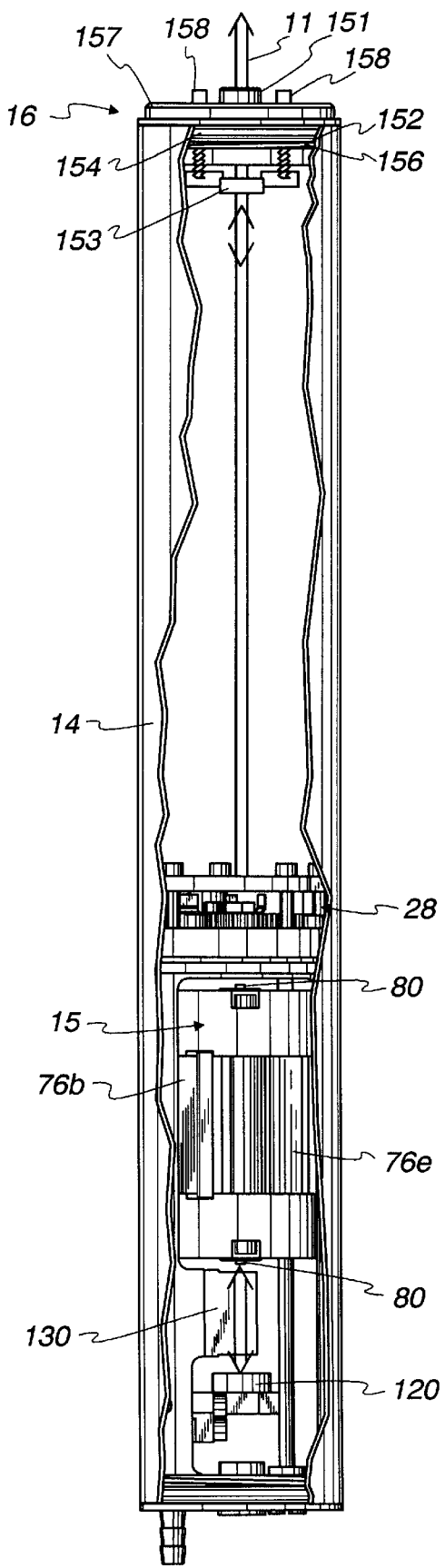
FIG. 8 is a side view of the solid-state laser system of the present invention.

In the side view of FIG. 8, the resonator cavity, including the OC assembly 16, can be more readily seen. The laser diode array assemblies 76 emit energy into the laser medium 80 which produces an output beam directed along its central axis. This output beam resonates between an output coupling (OC) mirror 153 in the OC assembly 16 and the HR mirror 120. The size of the beam that is directed toward the OC mirror 153 is limited by the size of the aperture being used in the aperture assembly 28.

If the system is being used to produce pulsed output power, the energy passes through the Q-switch 130. It should be noted that the Q-switch 130 can be placed on either side of the laser head 15.

The OC mirror 153 in the OC assembly 16which includes a beam output win 152 which includes a beam output window 151. The plug structure 152 seals the housing 14 due to an O-ring 154 being compressed when external threads 156 on the plug structure 152 are threaded into internal threads on the inner wall of the housing 14. The position of the OC mirror 153 is adjustable relative to the outer portion 157 of the plug structure 152 by manipulating a pair of screws 158. Accordingly, the OC mirror 153 can be finely adjusted to provide for the optimum laser beam 1. Consequently, the OC assembly 16 seals the housing 14 due to the O-ring 154, provides resonation through the laser cavity by its OC mirror 153, and emits the laser beam 11 through its output window 151.

The OC mirror 153 has a partially reflective coating on its surface such that a predetermined amount of energy is transmitted therethrough and released through the output window 151 as the laser beam 11. The remaining energy is reflected back toward the laser head assembly 15. The reflectivity of the OC mirror 153 determines the overall output in the laser beam 1. Also, the reflectivity must be enough to produce resonation through the laser medium 80. The OC mirror 153 can have a reflectivity that ranges from about 5% to about 94% (i.e. about 95% to 6% is transmitted as laser beam 11) with the optimum value being dependent on the application. In a preferred embodiment, the reflectivity of the OC mirror is about 90% for a laser system 10 operating in a CW mode. For a laser system operating in a pulsed mode, the reflectivity of the OC mirror 153 is approximately 70%. An OC mirror with a reflectivity of about 80% would serve both modes of operation.

Regarding the dimensions of the solid-state laser system 10, the outside diameter of the housing 14 is usually less than 3 inches, and preferably less than 2 inches so as to be fully compatible with the existing laser mount assemblies that are commonly used by laser operators. The length of the housing 14 is less than about 24 inches. The cylindrical configuration is advantageous since there are only two circular ends of the housing 14 that require sealing. Also, a cylindrical housing is easy to manufacture which reduces the cost of the finalized product.

The output of the laser system can vary greatly depending on the input power provided by the laser diodes array assemblies 76 and the amount of space which dictates the number of laser diodes that can be used and the size of the laser medium.

For example, when operating in a CW mode, the laser system 10 can easily provide 10 Watts of output power and power levels up to 100 Watts or more can also be attained. Similar output powers would be available in pulsed mode which requires the Q-switch 130. By way of example, in a laser system 10 where the housing 14 is about 1.75 inches in diameter and 500 Watts of electrical input power are placed in laser diode array assemblies 76 which emit energy into a laser medium 80 having a diameter of 3 mm, the laser beam 11 has approximately 50 Watts of output power.

The laser system 10 may require a specific internal environment for optimum operation. For example, the system 10 could be back-filled with dry nitrogen if it is equipped with a simple valve on its external surface. Alternatively, the final assembly step (e.g. threading the output coupler assembly 16 to the housing 14) could be performed in a low-moisture atmosphere. In yet a further alternative, the laser system 10 may include a desiccant within the housing 14 that absorbs the moisture once the housing 14 is sealed. It should be noted that the cylindrical geometry of the housing 14 makes it easy to preserve the internal environment within the housing due to the fact that only two circular ends require sealing.

Figure 9:
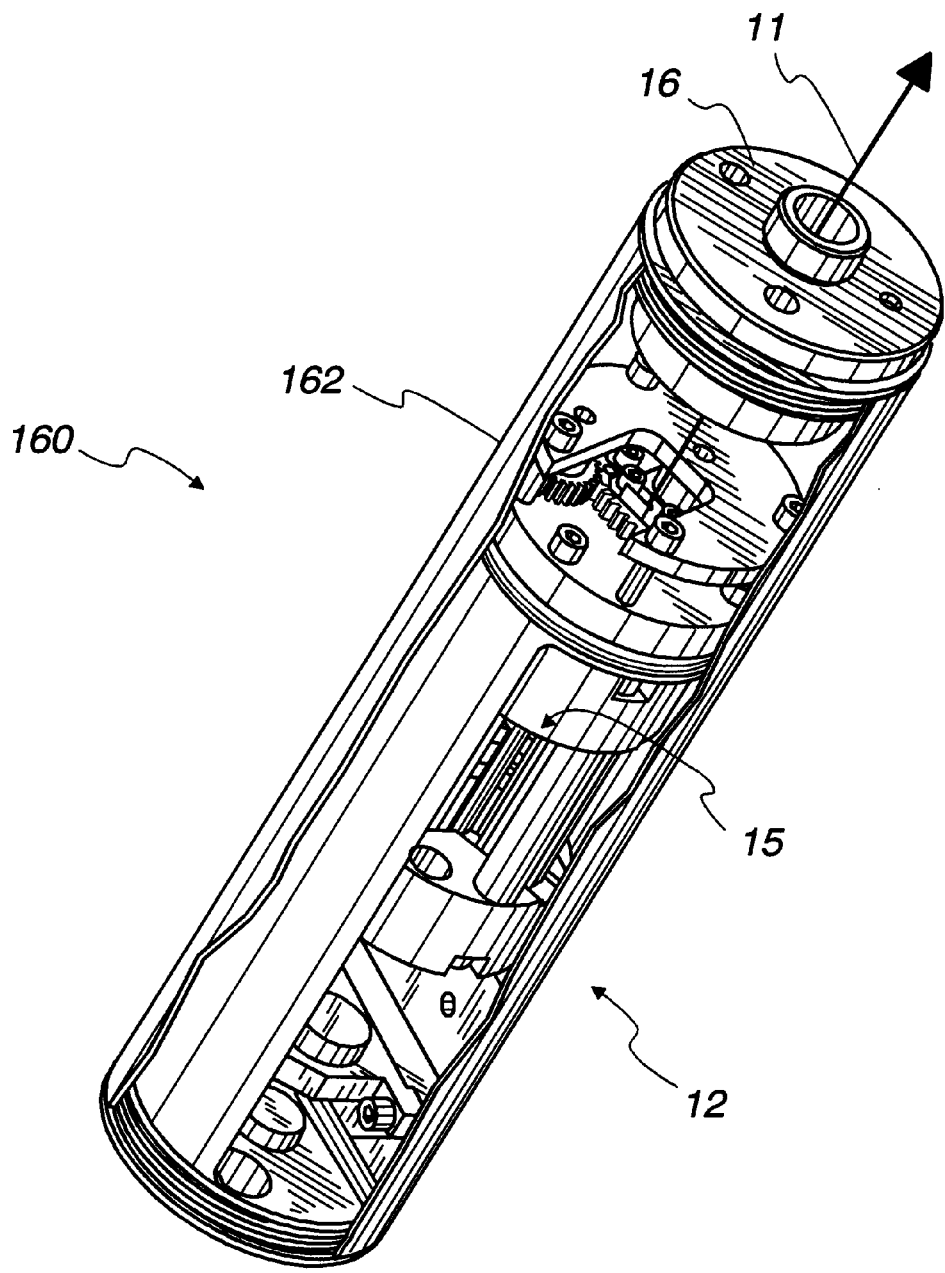
FIG. 9 is an isometric view of an alternative laser assembly having a shorter length.

FIG. 9 is an isometric view of an alternative laser assembly having a shorter length that can be used for a continuous wave (CW) mode of operation. The laser system 160 has the same optics bench assembly 12, output coupling assembly 16, and laser head assembly 15. However, these components are placed in the housing 162 that has a much shorter length than the housing 14 in FIGS. 1–8. The length of the housing 160 has been shortened because when a pulsed mode of operation is necessary, the length of the laser resonator cavity, defined by the output coupling mirror and the HR mirror, must be longer. In a CW mode, the length of the laser resonator can be shortened. Because no pulsing of the output beam is needed, the Q-switch 130 is removed form the optics bench assembly 12. Thus, while the housing 14 can be used for either a CW or pulsed mode of operation, the housing 162 is used only for CW output power applications.

In an alternative embodiment, the OC mirror can be moved onto the optics bench assembly 12 such that the system can be entirely aligned before being packaged in the housing 162. This alignment process can be made easier if the laser medium 80 has the HR coating on its end surface opposing the OC mirror.

Figure 10:
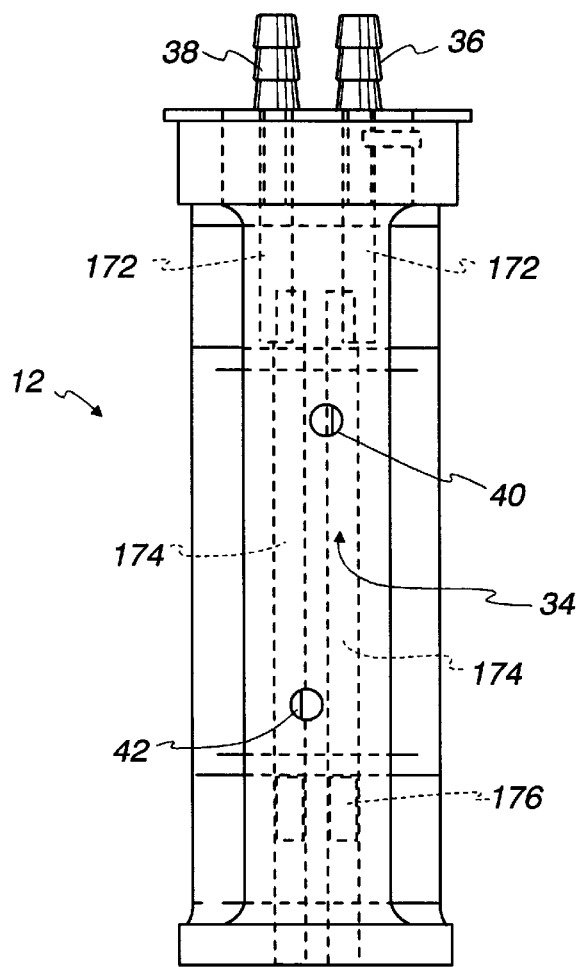
FIG. 10 illustrates the primary manifold of the optics bench of the present invention.

FIG. 10 illustrates the construction of the primary manifold 34 of the optics bench assembly 12. Each inlet segment of the primary manifold 34 is produced by drilling a first bore 172 that is concentric inlet port 36. A second bore 174 is then drilled from the reverse side of the optics bench assembly 12 which intersects with the opening 40 and also the first bore 172. The second bore 174 is then provided with a plug 176. The outlet segment is produced in a similar manner. Thus, the fluid which enters the inlet port 36 flows through the first bore 172, into the second bore 174, and out opening 40. After the fluid has circulated through the secondary manifold of the laser head assembly 15, it returns in the reverse path through the outlet segment of the primary manifold 34 to the exit port 38.

While only two fluid openings 40 and 42 are illustrated, a plurality of openings for various components requiring heat removal is available. Also, because the entire optics bench assembly 12 is acted upon by the fluid, the directly mounted components, such as the Q-Switch 130, also receive the cooling effect of the fluid.

Figure 11:
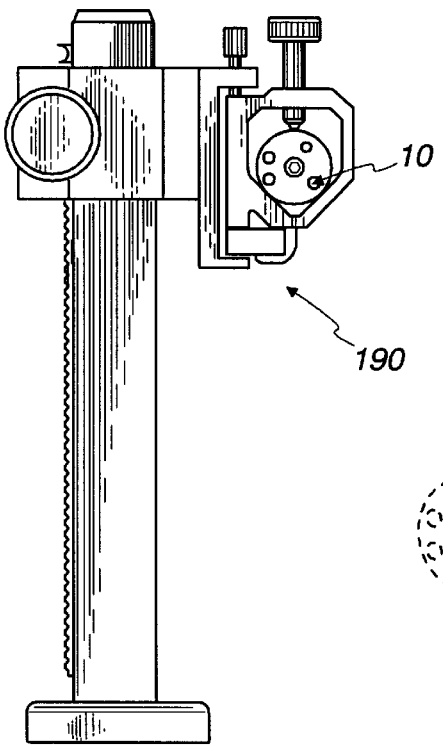
FIG. 11 is a laser mount assembly.
Figure 12:
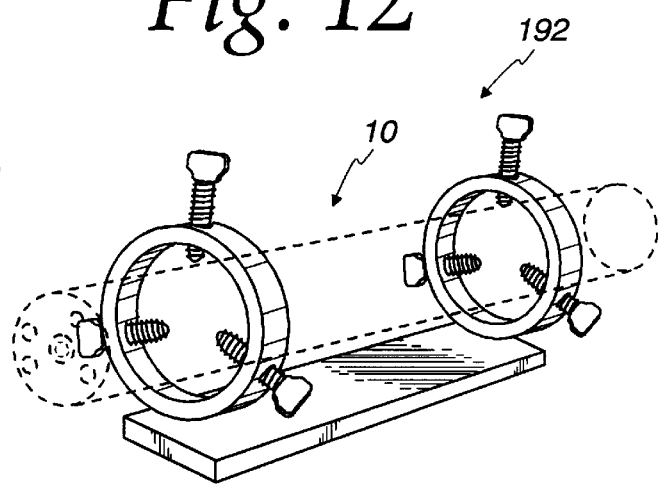
FIG. 12 is an alternative laser mount assembly.

FIGS. 11 and 12 illustrate two types of laser mount assemblies 190 and 192 which are commonly used to hold He—Ne lasers. Numerous other types of mounts which serve the same purpose of holding a cylindrical laser system are available as well. Because of the unique shape of the high-power, solid-state laser system 10 (shown in dashed lines), this system 10 can be placed within either of these mount assemblies 190 and 192 which are shown, as well as the other commonly available mount systems for cylindrical lasers. Thus, the high-power solid-state laser system 10 can be used for a wide variety of purposes and mounted for such use by a simple mount assembly. Moreover, since there is no "up" or "down," the laser system 10 can be operated in a variety of orientations.

Figure 13A:
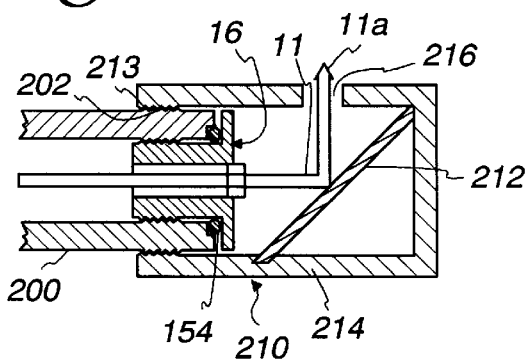
FIGS. 13A–13C illustrate an alternative cylindrical housing that can be coupled to laser beam altering devices.
Figure 13B:
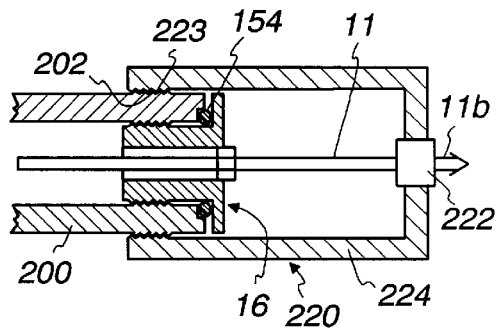
Figure 13C:
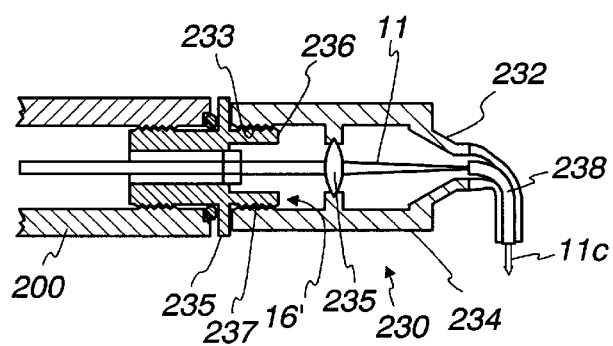

FIGS. 13A–13C illustrate the output end section of an alternative housing 200 which differs from housing 14 only in that it contains threads 202 on its external surface for engaging a device which acts upon the laser beam 11. The output coupler assembly 16 is the same that was previously discussed. In FIG. 13A, a device 210 containing a mirror 212 is attached to the housing 200 via the internal threads 213 located on its cylindrical structure 214. The mirror 212 directs the beam at a predetermine angle. An aperture 216 in the cylindrical structure 214 allows the redirected beam 11a to exit from the structure 214. The mirror 212 could also be adjustable to allow the exiting of the redirected beam 11a at a variety of angles.

In FIG. 13B, a device 220 containing a frequency doubling crystal 222 (e.g. KTP crystal) within its cylindrical structure 224 is attached to the housing 200 via internal threads 223 mating with the external threads 202 of the housing 200. Thus, after the laser beam 11 passes through the crystal 222, a laser beam 11b having twice the frequency (half the wavelength) is produced. Of course, other types of frequency/wavelength altering devices could be used as well.

In FIG. 13C, an alternative embodiment is shown. A device 230 contains a beam-guiding region 232 within its cylindrical structure 234 and a lens 235 to focus the beam toward the beam-guiding region 232. The structure 234 is attached to the housing 200 via internal threads 233 mating with the external threads 237 on the protruding region 236 of the modified OC assembly 16'. Accordingly, housing 200 is no different than housing 14. Thus, once the laser beam 11 enters a beam-guiding region 232, it can be focused down until a point where it is sent through a fiber-optic cable 238. The fiber-optic cable 238 then emits a high power beam 11c.

Other structures can be mounted as well. Simple lenses for creating a telescope can be readily mounted. If the components being mounted require the removal of heat, fins can be added to the external structure of the devices to remove the heat through convection. Furthermore, combinations of structures (e.g. frequency altering device and a fiber-optic structure) can be attached to the housing 200. In any event, the external threads 202 on the laser housing 200 or the external threads 237 on the modified OC assembly 16' provide for much flexibility in adding pieces to the laser system that affect the output beam 11. Alternatively, a series of fasteners could be used instead of the external threads 202 to accomplish the same result.

Each of these embodiments and obvious variations thereof is contemplated as falling within the spirit and scope of the invention, which is set forth in the following claims.

What is claimed is:

1. A solid-state laser system for producing a high-power laser beam, comprising:

a solid-state laser medium having a central axis, first and second end surfaces, and a cylindrical outer surface between said end surfaces;

a plurality of optical energy sources producing optical energy to be absorbed in said laser medium, each of said plurality of optical energy sources being disposed to emit said optical energy into said cylindrical outer surface and being spaced at an angle relative to said central axis from an adjacent one of said plurality of optical energy sources;

resonating means substantially optically aligned with said central axis for producing laser resonation of energy produced by said laser medium through said first and second end surfaces of said laser medium, said resonating means including a pair of opposing reflective surfaces positioned with said laser medium therebetween, one of said opposing reflective surfaces being an output coupling mirror for reflecting a portion of said energy produced by said laser medium to provide said laser resonation and for transmitting said high-power laser beam;

an optics bench for mounting said laser medium and said plurality of optical energy sources; and a cylindrical housing having a diameter of less than about 2.0 inches, said cylindrical housing including means for mechanically coupling said optics bench assembly to said housing near a first end of said housing, said cylindrical housing including said output coupling mirror at a second end.

2. The solid-state laser system of claim 1, wherein said output coupling mirror is a separate piece from said cylindrical housing, said housing having means for detachably attaching said output coupling mirror at said second end.

3. The solid-state laser system of claim 2, further including means for sealing said second end of said housing after attachment of said output coupling mirror.

4. The solid-state laser system of claim 1, wherein said output coupling mirror has a structural assembly that mates with said housing, at least one of either said structural assembly and said second end of said cylindrical housing includes means for receiving a component that modifies said high-power laser beam after being transmitted through said output coupling mirror.

5. The solid-state laser system of claim 4, wherein said component is a mirror which changes the direction of said laser beam.

6. The solid-state laser system of claim 4, wherein said component is a crystal which changes the wavelength of said laser beam.

7. The solid-state laser system of claim 4, wherein said component is a fiber-optic coupler for focusing said laser beam into a fiber-optic cable.

8. The solid-state laser system of claim 4, wherein said component is a lens.

9. The solid-state laser system of claim 1, wherein said plurality of optical energy sources are semiconductor laser diodes.

10. The solid-state laser system of claim 1, wherein the other of said opposing reflective surfaces is an HR mirror that is mounted on said optics bench assembly.

11. The solid-state laser system of claim 1, wherein said optics bench assembly includes a circular end piece that fits within and closes off said first end of said cylindrical housing.

12. The solid-state laser system of claim 11, wherein said mechanical coupling means of said cylindrical housing includes an internal thread structure for mating with an external thread structure on said circular end piece of said optics bench assembly.

13. The solid-state laser system of claim 11, wherein said mechanical coupling means of said cylindrical housing further includes an O-ring which fits between said optics bench assembly and an internal wall of said cylinder near a portion of said optics bench assembly that is opposite said circular end piece.

14. The solid-state laser system of claim 1, further including a Q-switch for producing said laser beam in a pulsed mode, said Q-switch being mounted on said optics bench assembly and being aligned with said central axis.

15. The solid-state laser system of claim 1, wherein one of said reflective surfaces is a reflective coating placed on one of said ends of said laser medium.

16. The solid-state laser system of claim 1, wherein said cylindrical housing is a unitary tubular member.

17. A solid-state laser system for producing a high-power laser beam, comprising:
a solid-state laser medium having a central axis, first and second end surfaces, and a cylindrical outer surface between said end surfaces;
a plurality of optical energy sources producing optical energy to be absorbed in said laser medium, each of said plurality of optical energy sources being disposed to emit said optical energy into said outer surface of said laser medium and being spaced at an angle relative to said central axis from an adjacent one of said plurality of optical energy sources;
resonating means substantially optically aligned with said central axis for producing laser resonation of energy produced by said laser medium through said first and second end surfaces of said laser medium, said resonating means including a pair of opposing reflective surfaces positioned with said laser medium therebetween;
an optics bench assembly for mounting said laser medium and said plurality of optical energy sources;
a cylindrical housing having a diameter of less than about 3.0 inches, said housing including means for mechanically coupling said optics bench assembly to said housing; and
means for circulating a fluid into said cylindrical housing to remove heat produced from said laser medium and said plurality of optical energy sources.

18. The solid-state laser system of claim 17, wherein said circulating means includes a fluid circulation passage extending internally through said optics bench assembly to provide cooling to components mounted on said optics bench assembly.

19. The solid-state laser system of claim 17, wherein said circulating means provides a parallel fluid path past each of said plurality of optical energy sources and said laser medium.

20. The solid-state laser system of claim 17, wherein said optics bench assembly includes a base structure and a pair of end caps at least one of which is detachable from said base structure, said laser medium being mounted between said pair of end caps, one of said pair of end caps having a fluid inlet region for receiving said fluid that is to flow between an inner surface of flow tube and said outer surface of said laser medium, the other of said pair of end caps having a fluid outlet region for receiving said fluid that has been introduced to said laser medium, said fluid inlet and outlet regions being a part of said circulating means.

21. The solid-state laser system of claim 20, wherein each of said plurality of optical energy sources is mounted between said pair of end caps and includes an integral heat exchanger, said integral heat exchangers receiving said fluid from said fluid inlet region and returning said fluid to said fluid outlet region such that each of said plurality of optical energy sources and said laser medium are in a parallel fluid path.

22. The solid-state laser system of claim 20, wherein both of said pair of end caps are detachable from said base structure.

23. The solid-state laser system of claim 17, further including a Q-switch for producing said laser beam in a pulsed mode, said Q-switch being mounted on said optics bench assembly.

24. The solid-state laser system of claim 17, wherein said cylindrical housing includes an output coupling mirror at one of its ends for reflecting a portion of said energy produced by said laser medium and for transmitting said high-power laser beam, said output coupling mirror being one of said opposing reflective surfaces.

25. The solid-state laser system of claim 17, wherein said circulating means includes an inlet port and an exit port, said optics bench assembly including a circular end piece that fits within and closes one end of said cylindrical housing, said inlet port and outlet port being positioned on said circular end piece.

26. The solid-state laser system of claim 25, further including an opening in said circular end piece aligned along said central axis, said opening providing for the alignment of said laser medium and at least a portion of said resonating means prior to installation of said cylindrical housing around said optics bench assembly.

27. The solid-state laser system of claim 17, wherein said optical energy source is a plurality of semiconductor laser diodes.

28. The solid-state laser system of claim 17, wherein said fluid circulating means includes a primary manifold in said optics bench assembly, said primary manifold having at least two openings for moving fluid into and receiving fluid from a laser head assembly in which said plurality of optical energy sources and said laser medium are assembled, said fluid circulating means further including a secondary manifold in said laser head assembly for receiving said fluid from said primary manifold, distributing said fluid past said plurality of optical energy sources and said laser medium, and returning said fluid to said primary manifold system.

29. The solid-state laser system of claim 17, wherein said cylindrical housing is a unitary tubular member.

30. The solid-state laser system of claim 17, wherein said housing has a diameter less than 2.0 inches.

31. A solid-state laser system for producing a high-power laser beam greater than 10 Watts of output power, comprising:
a solid-state laser medium having a central axis, first and second end surfaces, and a cylindrical outer surface between said end surfaces;
a plurality of semiconductor laser diode arrays producing optical energy to be absorbed in said laser medium, each of said plurality of laser diode arrays disposed to emit optical energy into said cylindrical outer surface, each of said laser diode arrays being circumferentially spaced at an angle relative to said central axis from an adjacent one of said plurality of laser diode arrays;
first and second reflective surfaces substantially optically aligned with said central axis for producing laser resonation of energy produced by said laser medium between said first and second end surfaces of said laser medium, said first reflective surface having a high reflectivity and being positioned on one side of said laser medium, said second reflective surface being an output coupling mirror with a lower reflectivity than said first reflective surface and being positioned on the opposite side of said laser medium, said output coupling mirror reflecting a portion of said energy from said laser medium and transmitting said laser beam;

a structure for mounting said laser medium and said plurality of laser diode arrays;

a cylindrical housing having a diameter of less than about 2.0 inches and being a unitary tubular member, said cylindrical housing including means for mechanically coupling said optics bench assembly to said housing, said second mirror being detachably connected to the end of said cylindrical housing; and means for circulating a fluid into said cylindrical housing to remove heat produced from said laser medium and said plurality of optical energy sources, said fluid circulating means including an inlet port and an exit port at the end of said housing opposite said output coupling mirror and providing a parallel cooling fluid path for each of said laser diode arrays and said laser medium.

32. A method of assembling a solid-state laser system into a cylindrical housing, said laser system including a solid state laser medium and a plurality of optical energy sources for producing optical energy to be absorbed in said laser medium, said laser system further including first and second mirrors substantially aligned for producing laser resonation that results in a high-power laser beam, said method comprising the steps of:

providing an optics bench assembly;

mounting said laser medium and said plurality of optical energy sources on said optics bench assembly, said optical energy sources being positioned near said laser medium;

mounting at least one other optical component on said optics bench assembly;

aligning said at least one other optical component and said laser medium on a common axis; and installing said optics bench assembly into one end of said cylindrical housing.

33. The method of claim 32, wherein said step of aligning includes the step of positioning said optics bench assembly at a distance from a test mirror which represents said second mirror and operating said optical energy sources to produce laser resonation between said test mirror and said first mirror.

34. The method of claim 32, wherein said optics bench assembly includes a fluid circulation manifold for cooling said laser medium and said optical energy sources, said step of aligning includes the step of circulating said fluid through said optics bench assembly and operating said optical energy sources to produce laser resonation.

35. The method of claim 32, further including the step of installing said second mirror at said other end of said cylindrical housing.

36. The method of claim 32, wherein said step of installing said optics bench assembly into said one end of said cylindrical housing includes the step of engaging external threads on a circular end piece of said optics bench assembly with internal threads on an interior wall of said housing.

37. The method of claim 32, wherein said first mirror is a reflective coating on an end of said laser medium.

38. The method of claim 32, wherein said laser system is to operate in a pulsed mode and includes a Q-switch, said at least one other component being said Q-switch.

39. The method of claim 32, wherein cylindrical housing is a unitary tubular member.

40. The method of claim 32, wherein cylindrical housing has a diameter of less than about 2.0 inches.

41. The method of claim 32, wherein said at least one other optical component is one of said first and second mirrors.

42. A solid-state laser system for producing a high-power laser beam, comprising:

a solid-state laser medium for producing said laser beam and having a central axis, first and second end surfaces, and an outer surface between said end surfaces, said laser beam being substantially along said central axis;

a plurality of optical energy sources producing optical energy to be absorbed in said laser medium and resulting in said laser medium producing said laser beam, each of said plurality of optical energy sources emitting said optical energy into said laser medium through said outer surface;

resonating means substantially optically aligned with said central axis for producing laser resonation through said first and second end surfaces of said laser medium, said resonating means including a pair of opposing reflective surfaces positioned with said laser medium therebetween;

a gear assembly including at least first and second gears, said second gear including a plurality of apertures, said first gear driving said second gear to move one of said plurality of apertures into alignment with said central axis;

a housing for covering said laser medium, said plurality of optical energy sources and at least a portion of said resonating means, said housing having an output window for releasing said laser beam; and means for rotating said second gear, said rotating means including an actuation portion which is accessible on the exterior of said housing.

43. The solid-state laser system of claim 42, wherein said rotating means includes an elongated shaft on said second gear which terminates into a screw head on said exterior of said housing, said screw head being said actuation portion.

44. The solid-state laser system of claim 42, further including detent means for releasably locking said first gear in a plurality of positions, each of said plurality of positions resulting in a corresponding one of said plurality of apertures being aligned with said central axis.

45. The solid-state laser system of claim 42, wherein one of said apertures is entirely closed so as to prohibit the release of said laser beam from said output window of said housing.

46. A solid-state laser system for producing a laser beam, comprising:

a flow tube having a central axis, an interior wall defining a cylindrical interior cavity, and a cylindrical exterior wall, said cylindrical exterior wall having a plurality of regions with a reflective coating that are separated by gaps where no reflecting coating is present;

a solid-state laser medium having a central axis, first and second end surfaces, and a cylindrical outer surface between said end surfaces, said laser medium being positioned substantially coaxially with said flow tube and within said cylindrical interior cavity, said laser medium absorbing optical energy at one wavelength and emitting optical energy at a second wavelength through at least one of said end surfaces to produce said laser beam;

an annular flow region defined between said interior wall of said flow tube and said outer wall of said laser medium, said annular flow region providing a path in the direction of said central axis for a fluid that cools said laser medium; and a plurality of optical energy sources positioned directly adjacent to said exterior cylindrical wall of said flow tube, each of said plurality of optical energy sources emitting optical energy that is transmitted into a respective one of said gaps in said reflective coating, through said flow tube, through said annular flow region, and into said laser medium for absorption therein, a portion of said optical energy that is not absorbed by said laser medium when transmitted through said laser medium is reflected off said reflective coating on said flow tube and sent back into said laser medium for absorption.

47. The laser system of claim 46, wherein said optical energy from each of said plurality of optical energy sources is generally centered along a line that is substantially parallel to said central axis, said gaps in said reflective coating having a shape of a narrow rectangle when said flow tube is viewed from the side, said line overlapping said narrow rectangle.

48. The laser system of claim 47, wherein said exterior surface of said flow tube has a first diameter, the circumferential width of said narrow rectangle being approximately 20% of said first diameter.

49. The laser system of claim 47, wherein said reflective coating is layer of silver having a thickness of approximately 2000 Angstroms.

* * * * *

UNITED STATES PATENT AND TRADEMARK OFFICE
CERTIFICATE OF CORRECTION

PATENT NO. : 6,026,109
DATED : February 15, 2000
INVENTOR(S) : Micke, et al.

It is certified that error appears in the above-identified patent and that said Letters Patent is hereby corrected as shown below:

Title page, should read as follows:

Item [56] References Cited: U.S. Patent Documents: Please add
        5,561,684 ...    10/1/96 ... Martin Foreign Patent Documents: Please add
        JP 8-204263 ... 8/9/96
        EP 0 743 724 A1 ... 11/20/96
        GB 2 190 784 A ...    11/25/87

Column 9,
Lines 25-26, replace "16which includes a beam output win 152" with
-- 16 is attached to a plug structure 152 --
Line 33, replace "1." with -- 11. --
Line 45, replace "1." with -- 11. --

Column 10,
Line 4, no new paragraph after the word medium. on line 3.

Signed and Sealed this

Ninth Day of October, 2001

Attest:

NICHOLAS P. GODICI
Attesting Officer     Acting Director of the United States Patent and Trademark Office